United States Patent Office 3,618,302
Patented Nov. 9, 1971

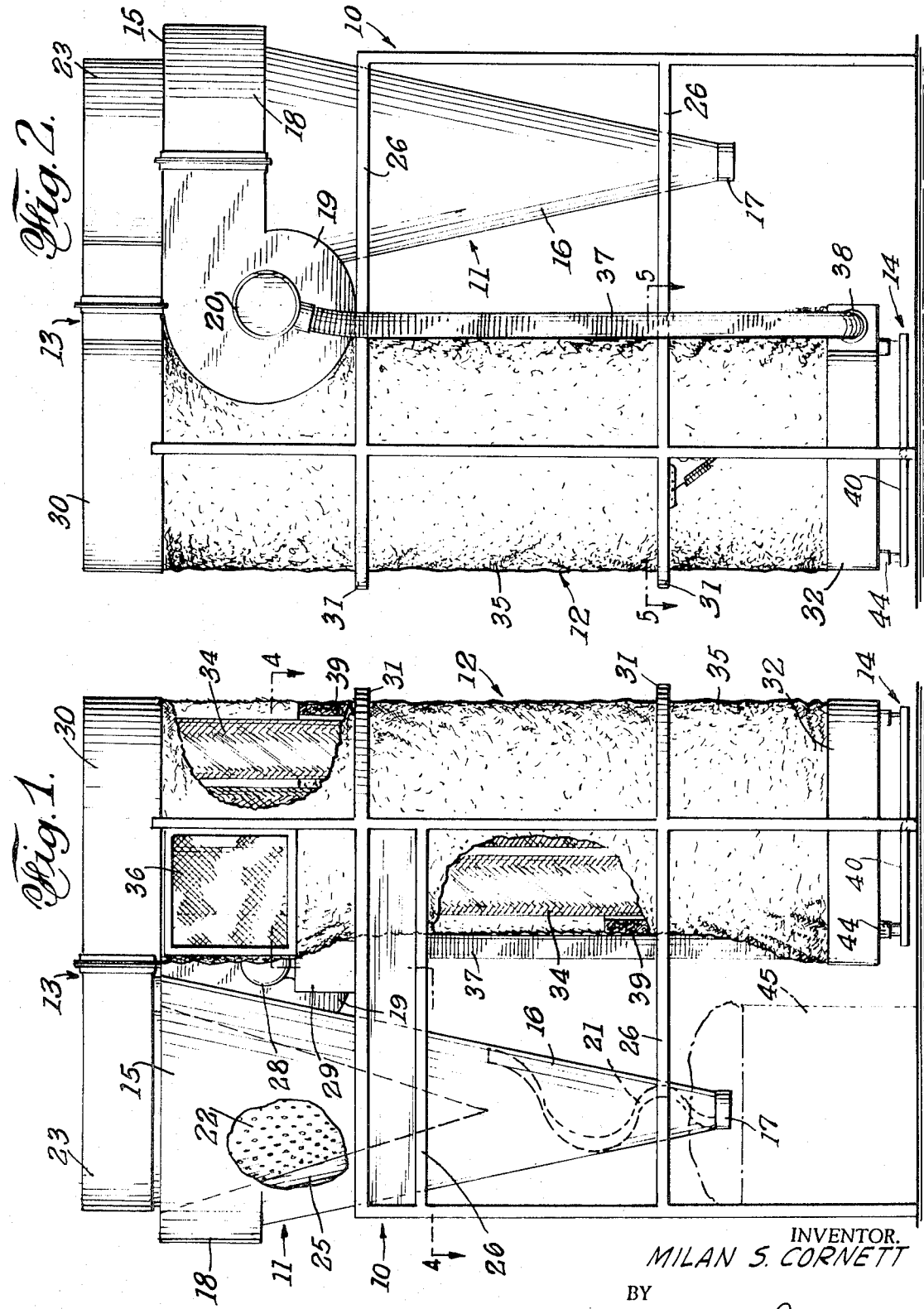

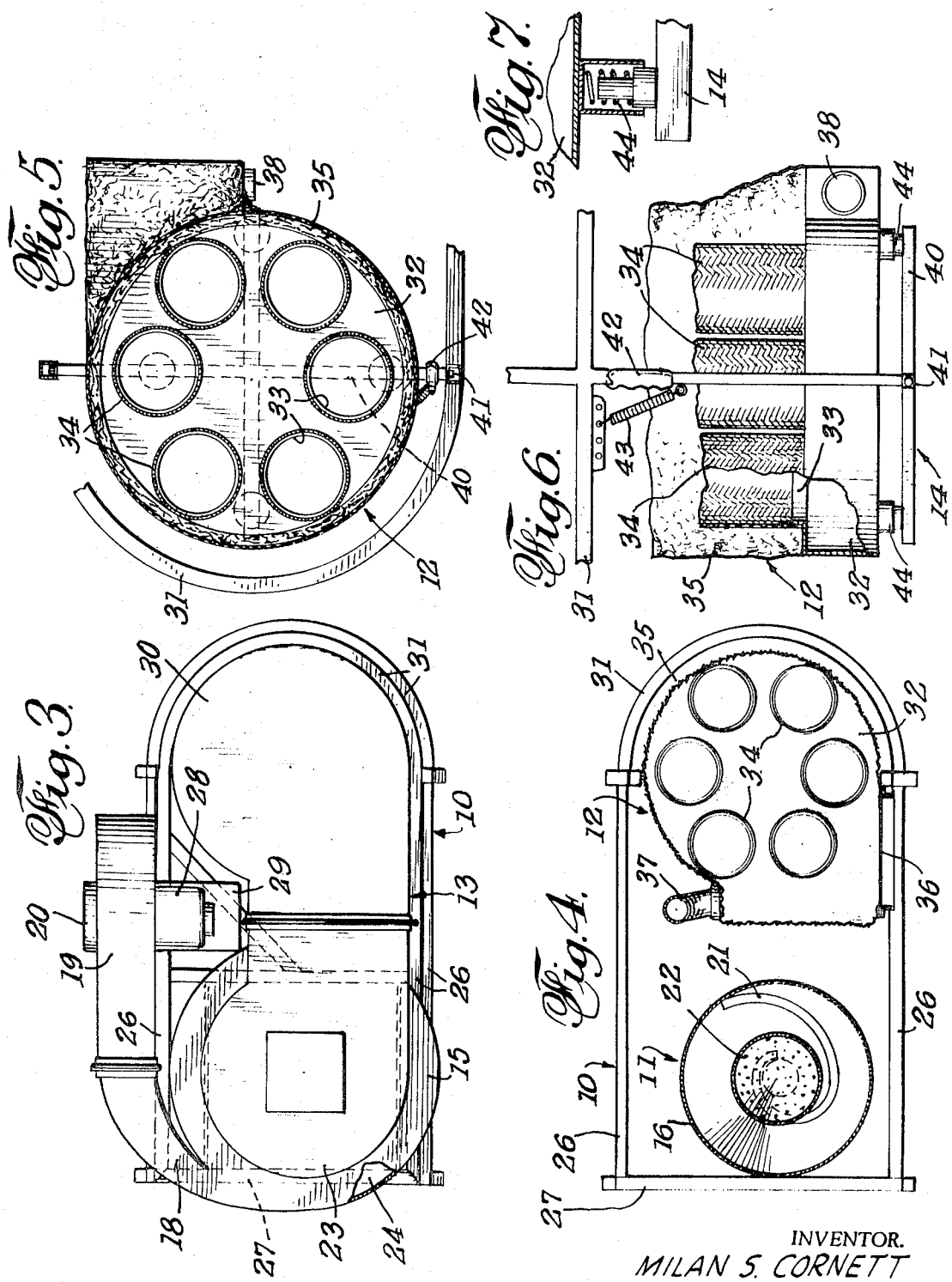

3,618,302
UNITARY PORTABLE AIR CLEANER
Milan S. Cornett, Walnut, Calif.
(P.O. Box 567, San Dimas, Calif. 91773)
Filed Oct. 17, 1969, Ser. No. 867,145
Int. Cl. B01d 46/04, 50/00
U.S. Cl. 55—278       3 Claims

ABSTRACT OF THE DISCLOSURE

An air cleaner that embodies a closed system comprising a centrifugal dust separator with an internal spark arrester constituting a pre-cleaner, and an after filter that recirculates the air discharged from the pre-cleaner and which further cleans said recirculated air before directing said cleaned air to the inlet of the centrifugal dust separator.

SUMMARY OF THE INVENTION

Field of the invention

Separating dust or other particles from an air flow before discharging the air to atmosphere.

Description of the prior art

Applicant has no knowledge of any means that has the unitary, compact and portable structure of this invention, nor of any such means that first pre-cleans the dust-laden air flow and then recirculates the air thus cleaned to remove residual dust particles before part thereof is discharged to atmosphere and part is returned to the inlet of the pre-cleaner to join with incoming dust-laden air directed to the pre-cleaner.

The after filter provides means for effecting return of the secondary dust to the flow to the pre-cleaner, thereby enabling such dust to more readily reach the dust outlet of the pre-cleaner. Applicant is unaware of any prior art suggestive of this feature.

It is an object of the present invention to provide a portable device operating on the above suggested two-stage dust-removing system, which is compact and requires only connection to electric power to be installed ready for operation.

Another object is to provide a device, as above characterized, that is self-cleaning and, therefore, clog-free.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following specification merely describes, one embodiment of the present invention, which is given by way of illustration or example only.

BRIEF DESCRIPTION OF THE DRAWINGS

In the drawings, like reference characters designate similar parts in the several views.

FIG. 1 is an elevational view as seen from one side, and partly broken away to show interior portions, of an air cleaner according to the present invention.

FIG. 2 is an elevational view of the opposite side.

FIG. 3 is a top plan view.

FIG. 4 is a cross-sectional view as taken on the line 4—4 of FIG. 1.

FIG. 5 is an enlarged and fragmentary cross-sectional view as taken on the line 5—5 of FIG. 2.

FIG. 6 is a partly broken fragmentary view of the portion of the device shown in FIG. 5.

FIG. 7 is a further enlarged sectional view of a detail.

DESCRIPTION OF THE PREFERRED EMBODIMENT

The present air cleaner comprises, generally, a support frame 10, a pre-cleaner 11 mounted vertically and disposed on one side of said frame, an after filter 12 mounted vertically in side-by-side relation to the pre-cleaner and disposed on the opposite side of said frame, a flow chamber 13 connecting the upper end of the cleaner 11 and after filter 12 to conduct the air discharged from the former to the inlet of the latter, and means 14 to dislodge accumulations of dust from the after filter for returning the same to the inlet of the pre-cleaner for recirculation therethrough with the air entering said pre-cleaner.

The pre-cleaner is shown as comprising an upper cylindrical part 15 from which downwardly extends a lower conically converging part 16 terminating in a reduced outlet 17 for dust separated from a centrifugally and helically moving dust-laden air flow, a tangential inlet 18 for the housing part 15, a centrifugal fan or blower 19 receiving dust-laden air at its inlet 20 and discharging it through the inlet 18 of the housing part 15, a helical dust skimmer 21 mounted on the inner surface of the conical housing part 16 in the lowermost portion thereof to guide movement of the dust in the flow downwardly toward the outlet 17, and an inner perforated screening cone 22 concentric with the upper portion of the converging housing part 16, with the apex thereof on an approximate level with the upper end of the baffle 21 and extending upwardly to the portion 23 of the flow chamber 13, through the cylindrical part, to form an annular chamber 24 in which the inlet flow of the dust-laden air moves.

Said annular passage 24 extends downwardly to a diverging passage 25 defined between the housing part 16 and the screening cone 22. The outlet 17 is restricted in size over that of the fan outlet, thereby creating a back pressure in the flow that causes an upward movement of air within the convolutions of the air flow in the conical passage 25. Most of the dust in such upwardly moving air flow is intercepted by the conical screen 22, while the air and the remaining dust pass through the orifices and upwardly into the portion 23 of the chamber 13.

The frame 10 mounts the conically converging part 16 which, as shown in FIG. 4, extends between side members 26 and inward of end members 27 of said frame. The fan 19, in the usual manner, has its rotor driven by a motor 28 on a support 29 extending inward from one of the side frame members 26.

The after filter 12 extends downwardly from the portion 30 of the flow chamber 13, being loosely enclosed by semi-circular portions 31 of the frame 10. Said after filter comprises a chamber 32 similar in form to the chamber portion 30 of the flow chamber 13. Said upper and lower chambers 30 and 32 are provided with a plurality of aligned collars 33 that are directed toward each other and serve to effect connection with the ends of tubular filter bags 34. Said bags are formed of air-pervious material. It will be understood that the air reaching the chamber portion 30 from the portion 23 will be forced downwardly into said bags 34. Most, if not all, of the dust in said air will be collected on the inner surfaces of said bags. Some of the dust may be carried by the air that reaches the chamber 32. Such air that passes through the bags 34 will enter the space around said bags and will be confined within a spark-retardant enclosure 35 that is generally coextensive with the bags 34 and connected at its ends to the chambers 30 and 32. Said enclosure 35 is preferably formed of a non-metallic and flexible fabric material, as are the bags 34.

The air entering the enclosure 35 is substantially dust-free and is discharged to atmosphere through a screened opening 36 preferably located near the upper end of the enclosure. The air reaching the chamber 32 will drop whatever dust is carried thereby in said chamber, and will be drawn through a flexible conduit 37 from the outlet 38 of the chamber 32 into the inlet 20 of the fan 19, where the same joins the atmospheric air drawn into the fan, as described. Fiber glass rings 39 may be provided on the inside of the enclosure to serve to filter air moving upwardly toward the screened opening 36.

During the operation of the device, the fan 19 creates a degree of vibration that, through the frame 10, is transmitted to the flow chamber 13 and therefrom to the bags 34 and enclosure 35. This results in some dislodgment of dust clinging to the filter bags and fabric enclosure. In addition to such dislodgment of dust, the means 14 may be used, from time to time, to jiggle the chamber 32, thereby alternately stretching and slacking off on the bags 34 and thus causing a more effective dislodgment of dust into the chamber 32 to be carried back through tube 37 to the fan inlet. Said means 14 is shown as a spider 40 that, by trunnions 41, is pivotally carried by the frame 10; an upwardly extending handle 42 on the spider may be used for vibrating said spider, a spring 43 biasing the handle and spider to a normal level position of the latter. Each arm of the spider has a spring cushion 44 between itself and the bottom of the chamber 32, the same comprising resilient transmission of the movement of the spider to said chamber, as well as allowing resilient vibratory movement of said chamber during operation.

Any suitable collecting receptacle 45 may be provided to receive the dust discharged from the outlet 17.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A unitary portable air cleaner comprising:
a vertical centrifugal pre-cleaner having a lateral, horizontal inlet for dust-laden air, a downwardly directed outlet for dust separated from said flow of dust-laden air, and an upwardly directed outlet for said air flow,
an after filter in side-by-side arrangement with the pre-cleaner and operatively constructed and arranged to receive said air flow from said outlet, said after filter being provided with a plurality of vertically extending air-pervious and flexible filter bags that separate dust remaining in said air flow and collect said dust while part of said air passes laterally through said bags and part continues downwardly in said bags,
a conduit operatively constructed and arranged for receiving air and dust from the space encompassed by each of said filter bags, said conduit extending from said after filter to the inlet of the pre-cleaner to recirculate air and dust into the pre-cleaner,
a flexible spark-arresting enclosure around said plurality of air-pervious bags,
a screened outlet in said enclosure to vent air entering thereinto from the plurality of bags,
means to vibrate said after filter to dislodge dust collected on the insides of the filter bags so the same is transported by the air moving to and in said conduit to the inlet of the pre-cleaner, and
said means to vibrate said after filter comprising means connected to the lower ends of the downwardly directed dust outlet and to the lower end of said flexible spark-arresting enclosure to dislodge dust collected on the insides of the filter bags for recirculation to the pre-cleaner through the mentioned conduit.

2. A unitary portable air cleaner according to claim 1:
the flexible enclosure being provided on its inside with fiber glass filter material to further remove dust from the air moving toward the screened outlet.

3. A unitary portable air cleaner comprising:
a centrifugal pre-cleaner having an inlet for dust-laden air and a downwardly directed outlet for dust separated from said flow of dust-laden air, and an upwardly directed outlet for said air flow,
an after filter operatively constructed and arranged for receiving said air flow and provided with a plurality of vertically extending air-pervious filter bags that separate dust remaining in said air flow and collect said dust while part of said air passes laterally through said bags and part continues downwardly in said bags,
a conduit operatively constructed and arranged for receiving air and dust from the space encompassed by each of said filter bags, said conduit extending from said after filter to the inlet of the pre-cleaner to recirculate air and dust into the pre-cleaner,
a flexible spark-arresting enclosure around said plurality of air-pervious bags,
a screened outlet in said enclosure to vent air entering thereinto from the plurality of bags,
means to vibrate said after filter to dislodge dust collected on the insides of the filter bags so the same is transported by the air moving to and in said conduit to the inlet of the pre-cleaner,
the flexible enclosure being provided on its inside with fiber glass material to further remove dust from the air moving toward the screened outlet,
said vibrating means comprising a pivotally movable spider located beneath the after filter, and
resilient means interposed between the arms of the spider and the lower portion of the after filter.

References Cited

UNITED STATES PATENTS

| | | | |
|---|---|---|---|
| 934,042 | 9/1909 | Christoph | 55—300 |
| 1,189,807 | 7/1916 | Glassford, Sr. | 55—300 X |
| 1,828,584 | 10/1931 | Andersen | 55—364 X |
| 1,895,585 | 1/1933 | Riebel, Jr. | 55—371 |
| 2,035,400 | 3/1936 | Paine | 55—341 |
| 2,520,589 | 8/1950 | White | 55—337 X |
| 2,982,532 | 5/1961 | Hakes | 55—341 X |
| 3,177,635 | 4/1965 | Cawl et al. | 55—337 X |
| 3,473,300 | 10/1969 | Wilm et al. | 55—302 |

FOREIGN PATENTS

| | | | |
|---|---|---|---|
| 332,475 | 7/1930 | Great Britain | 55—304 |
| 974,415 | 11/1964 | Great Britain | 55—337 |

DENNIS E. TALBERT, JR., Primary Examiner

U.S. Cl. X.R.

15—327 R; 55—305, 307, 324, 334, 337, 338, 341, 364, 381, 399, 431, 459, 466, 473, DIG 20